(12) United States Patent
Mussman et al.

(10) Patent No.: US 7,388,946 B1
(45) Date of Patent: Jun. 17, 2008

(54) SYSTEM AND METHOD FOR EVALUATING THE QUALITY OF SERVICE IN AN IP TELEPHONY NETWORK USING CALL FORWARDING

(75) Inventors: Harry Mussman, Bedford, MA (US); Vivek Santhana, Brighton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 979 days.

(21) Appl. No.: 10/653,561

(22) Filed: Sep. 2, 2003

(51) Int. Cl.
*H04M 1/24* (2006.01)
*H04M 3/08* (2006.01)
*H04M 3/22* (2006.01)
*H04J 1/16* (2006.01)

(52) U.S. Cl. .............. 379/15.01; 379/27.03; 379/28; 370/252; 370/352

(58) Field of Classification Search .......... 379/1.01, 379/1.03, 9, 15.01, 24, 28, 32.01, 32.02, 379/22.04, 27.02, 27.03, 27.08, 29.01; 370/216, 370/218, 229, 241, 247, 252, 352

See application file for complete search history.

(56) References Cited

U.S. PATENT DOCUMENTS

| | | | |
|---|---|---|---|
| 5,867,813 A | 2/1999 | Di Pietro et al. | |
| 5,878,113 A | 3/1999 | Bhusri | |
| 5,961,599 A | 10/1999 | Kalavade et al. | |
| 6,259,691 B1 | 7/2001 | Naudus | |
| 6,275,797 B1 | 8/2001 | Randic | |
| 6,363,053 B1 | 3/2002 | Schuster et al. | |
| 6,370,120 B1 * | 4/2002 | Hardy | 370/252 |
| 6,404,764 B1 | 6/2002 | Jones et al. | |
| 6,437,229 B1 | 8/2002 | Nobumoto | |
| 6,477,492 B1 | 11/2002 | Connor | |
| 6,512,746 B1 | 1/2003 | Sand | |
| 6,570,969 B1 | 5/2003 | Albal et al. | |
| 6,600,740 B1 | 7/2003 | Valentine et al. | |
| 6,603,774 B1 | 8/2003 | Knappe et al. | |
| 6,633,582 B1 | 10/2003 | Panburana et al. | |

(Continued)

FOREIGN PATENT DOCUMENTS

WO 00/72453 11/2000

OTHER PUBLICATIONS

Cole, et al.,: "Voice Over IP Performance Monitoring" Computer Communications Review, ACM SIGCOMM, Apr. 2001; pp. 9-24; Middletown, NJ; US; AT&T Laboratories.

(Continued)

Primary Examiner—Quoc Tran
(74) Attorney, Agent, or Firm—Hensley Kim & Holzer, LLC (57) ABSTRACT

Methods and systems are described for verifying communications paths on a network. A test signal is forwarded between network nodes to evaluate quality of service in an IP telephony system. A test call is generated by a call initiator, communicated to one or more network devices, and forwarded from the one or more network devices to a call recipient according to address information associated with the test call. During the test call, a test signal is communicated between the call initiator, the call recipient, and the one or more network devices. The quality of service of the IP telephony network is evaluated according to characteristics associated with the test signal.

44 Claims, 7 Drawing Sheets

U.S. PATENT DOCUMENTS

| | | |
|---|---|---|
| 6,665,271 B1 | 12/2003 | Thomas et al. |
| 6,665,293 B2 | 12/2003 | Thornton et al. |
| 6,700,953 B1 | 3/2004 | Maurer et al. |
| 6,707,827 B1 | 3/2004 | Shaffer et al. |
| 6,718,296 B1 | 4/2004 | Reynolds et al. |
| 6,721,541 B1 | 4/2004 | Kingsley |
| 6,735,175 B1 | 5/2004 | Havens |
| 6,738,353 B2 | 5/2004 | Chong |
| 6,741,569 B1 | 5/2004 | Clark |
| 6,748,433 B1 | 6/2004 | Yaakov |
| 6,754,232 B1 | 6/2004 | Tasker |
| 6,775,240 B1 * | 8/2004 | Zhang et al. ............... 370/251 |
| 6,778,496 B1 | 8/2004 | Meempat et al. |
| 6,834,040 B2 | 12/2004 | Tomberlin |
| 6,862,298 B1 | 3/2005 | Smith et al. |
| 6,876,647 B2 | 4/2005 | Celi, Jr. |
| 6,940,820 B2 | 9/2005 | Fang |
| 2002/0101860 A1* | 8/2002 | Thornton et al. ........... 370/352 |
| 2002/0131604 A1* | 9/2002 | Amine ........................ 381/58 |
| 2002/0143979 A1 | 10/2002 | Douceur et al. |
| 2002/0145979 A1 | 10/2002 | Baj |
| 2002/0167936 A1 | 11/2002 | Goodman |
| 2002/0167937 A1* | 11/2002 | Goodman ................... 370/352 |
| 2003/0009306 A1 | 1/2003 | Fang |
| 2003/0227870 A1* | 12/2003 | Wagner et al. .............. 370/229 |
| 2004/0003070 A1* | 1/2004 | Fernald et al. .............. 709/223 |

OTHER PUBLICATIONS

Conway, A.E., "A Passive Method for Monitoring Voice-Over-IP Call Quality with ITU-T Objective Speech Quality Measurement Methods"; Apr. 28-May 2, 2002; Communications, 2002; ICC 2002; IEEE International Conference, vol. 4 pp. 2583-2586.

DE, B.S. et al., "End-to-end Voice Over IP Testing and the Effect of QoS on Signaling"; Mar. 16-18, 2003; System Theory, 2003; Proceedings of the 35th Southeastern Symposium: pp. 142-147.

MA, Angus; "Voice over IP (VoIP) Testing Methodology and Case Studies", Spirentcom White Paper, 'Online! Feb. 2001; pp. 1-33; Spirent Communications; www.spirentcom.com.

Reynolds et al., "Quality VOIP—An Engineering Challenge" BT Technology Journal, vol. 19, No. 2 pp. 23-32: Apr. 2, 2001; BT Laboratories, GB.

Rix, A.W. et al.; "The Perceptual Analysis Measurement System for Robust End-to-End Speech Quality Assessment"; Jun. 5-9, 2000; Acoustics; Speech and Signal Processing, 2000; ICASSP 00; Proceedings; 2000 IEEE International Conference, pp. 1-4; vol. 3.

Rix, A.W. et al; "Perceptual Evaluation of Speech Quality (PESQ) A New Method for Speech Quality Assessment of Telephone Networks and Codecs"; May 7-11, 2001; Acoustics, Speech and Signal Processing, 2001; Proceedings; 2001 IEEE International Conference, vol. 2, pp. 749-752.

* cited by examiner

SYSTEM AND METHOD FOR EVALUATING THE QUALITY OF SERVICE IN AN IP TELEPHONY NETWORK USING CALL FORWARDING

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

RELATED APPLICATIONS

This application is related to the following pending applications, each of which is hereby incorporated herein by reference in its entirety:
application Ser. No. 09/855,156, titled EMBEDDING SAMPLE VOICE FILES IN VOICE OVER IP (VOIP) GATEWAYS FOR VOICE QUALITY MEASUREMENTS, filed May 14, 2001;
application Ser. No. 09/826,697, titled QOS TESTING OF A HARDWARE DEVICE OR A SOFTWARE CLIENT, filed Apr. 5, 2001; and
application Ser. No. 10/417,415, titled SYSTEM AND METHOD FOR IP TELEPHONY PING, filed Apr. 16, 2003.

BACKGROUND OF THE INVENTION

The invention disclosed herein relates generally to verifying communications paths on a network. More particularly, the present invention relates to forwarding a test signal between network nodes to evaluate quality of service in an Internet Protocol ("IP") telephony system.

The Open Systems Interconnection (OSI) specification provides a "reference model" for how messages should be transmitted between any two points in a telecommunication network. The purpose of the model is to guide product technology implementers so that their products will consistently work with other products. The reference model defines seven layers of functionality that take place at each end of a communications link. Layer 3 ("L3") refers to the network layer of the model, which is concerned with knowing the address of neighboring nodes in a network, selecting routes and quality of service ("QoS"), and recognizing and forwarding to the transport layer incoming messages destined for the local host. An Internet Protocol address is one example of a layer 3 address.

In Internet telephony systems, such as voice over IP ("VoIP") networks, quality of service between network nodes is an important concern. If the quality of service is too low, for example due to latency or the unavailability of a network node, then users may not be able to place calls or their calls may be distorted. Tools such as Ping (Packet Internet or Inter-Network Groper) are used to verify that a given IP address exists and can accept requests. Users and software processes employ Ping to diagnostically ensure that a host computer that the user is attempting to reach is actually operating. Ping may also be used to communicate with an operating host in order to determine the amount of time required to receive a response from the host, as well as other related statistics. The Ping software utility sends an Internet Control Message Protocol (ICMP) packet to a specified IP network address or a qualified domain name. ICMP is an extension to the IP protocol that supports packets with error, control and informational messages. The utility waits for replies from the address in response to receipt of the ICMP packet.

Current tools such as Ping, however, do not provide information regarding the state of connections between nodes based on information derived from an actual call placed on the network. Instead, these tools provide quality of service data inferred from the statistics gathered which may not be as accurate as data derived from an actual call.

Other tools such as those described in the above-referenced application Ser. No. 09/855,156 and application Ser. No. 09/826,697 do provide quality of service data inferred from data derived from an actual call. These tools, however, use reference files and other methods to test the quality of service at a particular network device, but they do not test the quality of service between network devices on a network path or in a loop of network devices. There is thus a need for a system and method that provides quality of service information for a VoIP network based on actual call data in a loop of network devices.

SUMMARY OF THE INVENTION

The present invention addresses, among other things, the problems discussed above with evaluating the quality of service in an IP telephony system.

In accordance with some aspects of the present invention, computerized methods are provided for evaluating the quality of service in an IP telephony network including communicating a test call from a call initiator to a network device, forwarding the test call from the network device to a call recipient according to address information associated with the test call, communicating, during the test call, a test signal between the call initiator and the call recipient, and evaluating the quality of service between the call initiator and the call recipient according to characteristics associated with the test signal received by the call recipient.

In some embodiments, communicating the test call comprises communicating the test call with associated address information such as an E.164 address or an IP address. In some embodiments, the test signal comprises a digital audio file.

In some embodiments, the call initiator, the network device, and the call recipient each may individually or collectively comprise a component of a device selected from the group consisting of: a voice over IP terminal, a gateway, call manager, and a private branch exchange.

In some embodiments the network device comprises a VoIP PBX and is set to forward the test call according to the associated address information. In some embodiments, the network device comprises a VoIP PBX and is set to forward the test call to a predetermined address. In some embodiments, the network device comprises a VoIP PBX and is set to forward the test call back to the call initiator, wherein the call initiator and call recipient are components within one test device. In some embodiments, the system is used to test the quality of service in a loop of devices wherein the test call is forwarded from a first network device to at least one other network device prior to being forwarded to the call recipient.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
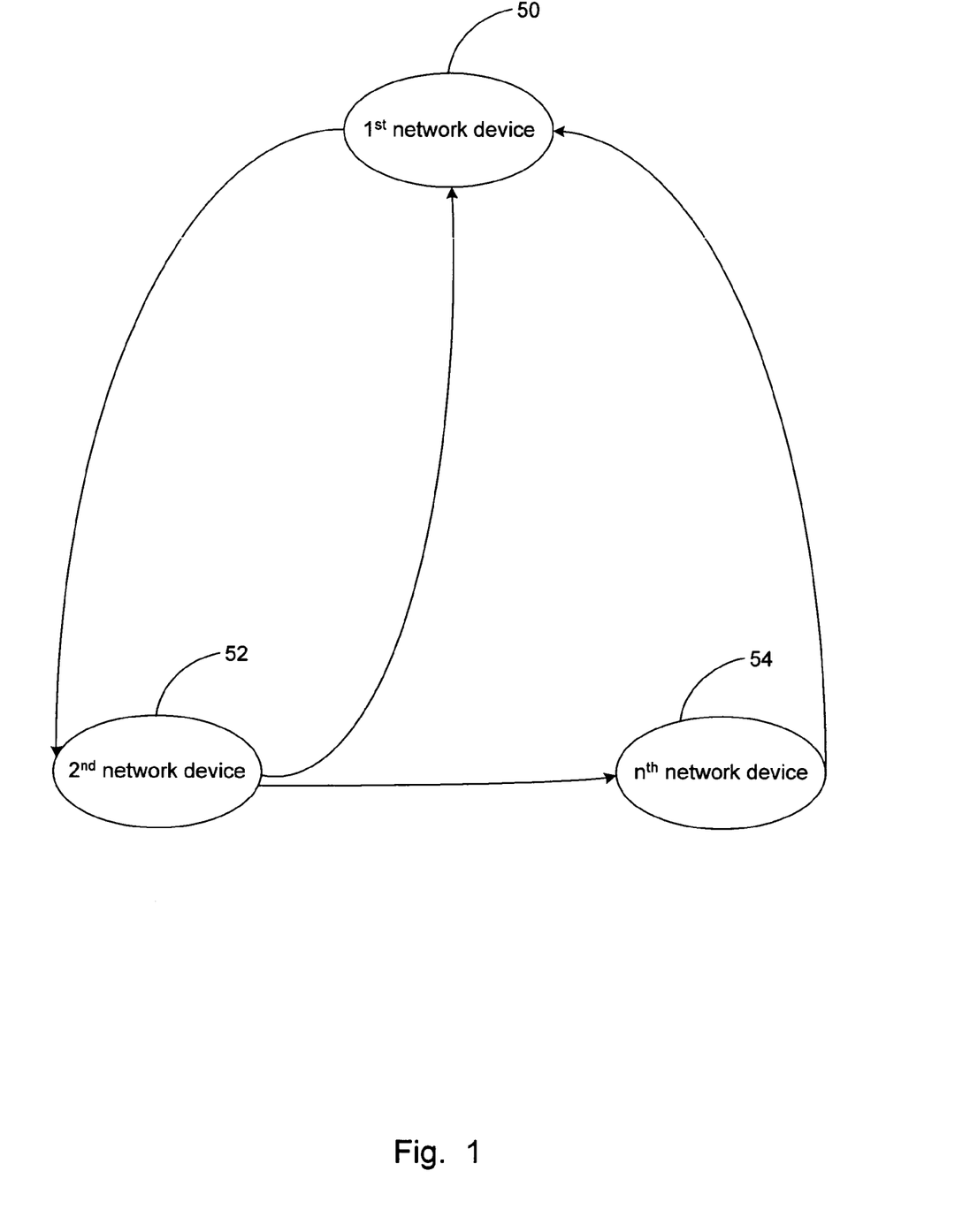
FIG. 1 is a block diagram of a method for evaluating the quality of service in an IP telephony system according to an embodiment of the invention.

With reference to FIGS. 1 through 7, embodiments of the invention are presented. FIG. 1 presents a high-level block diagram of a method for evaluating the quality of service in an IP telephony system according to an embodiment of the invention.

A call or other communication is made from a first network device 50 to a second network device 52. Each network device is associated with a phone number, a network address, or other identifier. For example, the network devices could be Internet telephony network nodes with IP addresses. The second network device 52 receives the communication and either forwards the communication back to the first network device 50 or forwards the communication to an $n^{th}$ network device 54. The $n^{th}$ network device 54 receives the communication and either forwards the communication back the first network device 50 or on to one or more additional network devices the last of which forwards the communication back to the first network device 50. Thus, the communication is sent via a loop of network devices commencing with the first network device 50, forwarded through one or more additional network devices, and then forwarded back to the first network device 50. Each network device 50, 52, and 54 receives and relaunches the communication. When the loop is completed and the communication is received back at the first network device 50, the quality of service of the loop of network devices is tested at the first network device 50 by evaluating characteristics associated with the communication as further described herein. For example, in some embodiments, a test signal is exchanged between network devices 50, 52, and 54 after a communication such as a test call has been setup between them.

Figure 2:
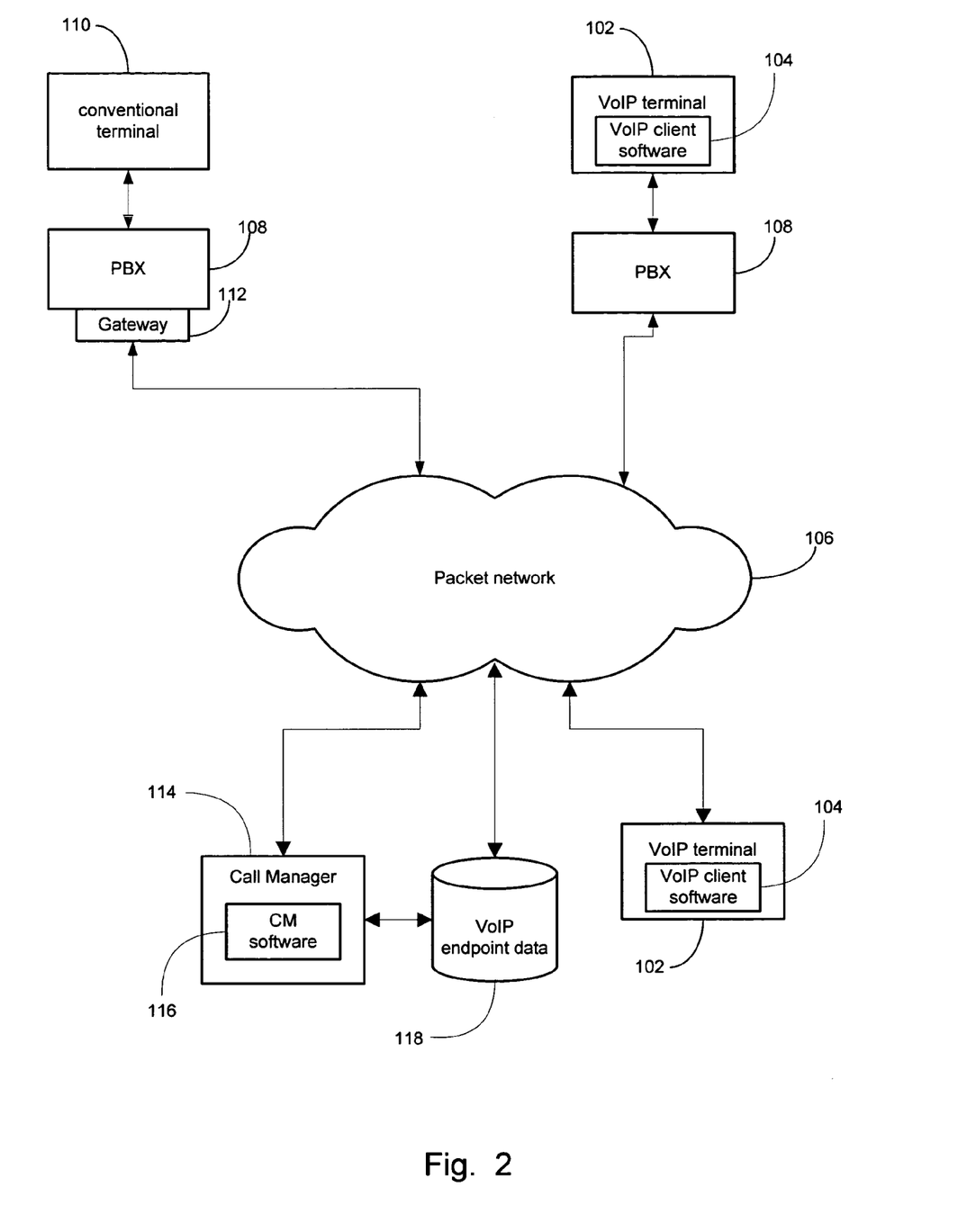
FIG. 2 is a block diagram of an exemplary configuration of hardware and software components for evaluating the quality of service in an IP telephony system according to an embodiment of the invention.

FIG. 2 presents one configuration of the hardware and software components for evaluating the quality of service in an IP telephony system according to an embodiment of the present invention. A VoIP implementation comprises a number of VoIP terminals 102 each executing and preferably maintaining VoIP client software 104. A VoIP terminal 102 may comprise a general-purpose personal computer that has audio input and output capabilities, as well as persistent and transient storage and a microprocessor (not shown) to maintain and execute the VoIP client software 104. The VoIP terminal 102 may also comprise a telephone that understands the Internet Protocol, such as a solution that provides complete functionality for an IP telephone set residing on a local area network ("LAN"). These devices integrate all the requisite functionality to interface directly to an Ethernet network, telephone handset, speakerphone, PDA, and other user interfaces. In some embodiments, terminals comprise conventional terminals 110 such as standard telephones and other devices known in the art.

According to one embodiment of the invention, the VoIP client software 104 that each VoIP terminal 102 executes adheres to the H.323 standard, which provides a foundation for audio, video and data communications across IP-based networks. The H.323 standard and its related annexes, available from the H.323 Forum at www.h323forum.org and at the International Telecommunication Union at www.itu.int, is hereby incorporated by reference herein in its entirety. Alternatively, the invention may be implemented using Session Initiation Protocol ("SIP"), Media Gateway Control Protocol ("MGCP"), or other well-known protocols for transporting voice and similar audio data over telecommunications networks.

VoIP terminals 102 initiate communications over an IP-based packet switched network 106. Each VoIP terminal 102 is assigned or provided with an address, such as an E.64 address, which is defined in the International Telecommunication Union's (ITU) international public telecommunication numbering plan, available at the ITU web site, and incorporated herein by reference in its entirety. When an E.164 address is supplied to the VoIP client software 104, an attempt is made to connect to the destination address. Where successful, the two endpoints 102 connect and voice or other multimedia communication commences.

In some embodiments of the invention, a VoIP terminal 102 communicates via a private branch exchange ("PBX") 108, such as an IP PBX. A PBX 108 is generally a special purpose computer or other telecommunications device, known in the art, which permits users to share a given number of outside lines for communications external to the PBX 108. For example, companies frequently employ PBXs 108 since they are more cost effective than hooking an outside line up to each telephone or VoIP terminal 102 in the enterprise. For example, a given company might have several hundred phones sharing only twenty outside lines via a PBX 108.

In some embodiments, a conventional terminal 110 communicates through a traditional (non-IP) PBX 108 fronted by a gateway 112 which, among other things, enables the traditional PBX 108 to connect to the packet network 106. A gateway 112 acts as a bridge between the packet network 106 and non-IP devices, such as traditional PBXs 108 in order to translate the packet-based data for transport to the PBX 108 and vice-versa.

According to one embodiment of the invention, a VoIP call manager 114 is available to provide users of VoIP terminals 102 with knowledge regarding the status of a given VoIP terminal 102 or PBX 108 or gateway 112 according to its address. In some embodiments, the call manager 114 is a computer or other telecommunications device capable of managing calls and testing the quality of service of those calls in an IP telephony system. The VoIP call manager 114 is in communication with a data store 118 comprising a set of VoIP endpoint data, e.g., E.164 address data, for all VoIP terminals 102 and PBXs 108 that the VoIP call manager 114 is to test. The VoIP endpoint data store 118 may comprise any number of well-known data storage paradigms, such as, tab, comma or similarly delimited flat file data structures, a relational database, an object-oriented database or a hybrid object-relational database. The VoIP endpoint data store 118 is preferably in direct communication with the VoIP call manager 114, such as a relational database maintained locally by the VoIP call manager 114. Alternatively, the VoIP endpoint data store 118 may be maintained remotely and accessed by the VoIP call manager 114 over a local or wide area packet based network 106, for example, the Internet.

VoIP call manager software 116 accesses the VoIP endpoint data store 118 to retrieve a set of address information for VoIP terminals 102 and PBXs 108 that the VoIP call manager 116 is to test. The VoIP call manager software 116 attempts to set up a call to a given telephone number so as to verify that the number or address is reachable. If the given VoIP terminal 102 or PBX 108 responds with an affirmative message to the VoIP call manager software 116 that the call has been accepted, e.g., an H.323 "call connect" message, the software 116 interprets this as a successful call. The call manager software 116 also performs call tear down, which is a mechanism for ending a call after the call is finished. If there is no affirmative message that the call is accepted, or if the call is rejected, e.g., an H.323 ARJ received or SIP 503 service unavailable response, the call manager software 116 determines that call has failed. The call manager software 116 also records the success or failure of an attempt to place a call, which is made available to users, administrators, and other software processes. In some embodiments, the call manager 114 and call manager software 116 are components of a PBX 108.

During the call setup process or during the call itself, the VoIP call manager software 116 may perform call quality measurements to provide enhanced data regarding a given VoIP terminal 102 or PBX 108. The VoIP call manager software 116 comprises mechanisms to perform measurements, vary media flow, and extract data from the call that provides information regarding the quality of a VoIP connection. Exemplary call quality parameters or metrics include, but are not limited to, multidirectional voice path continuity, the amount of time required to set up the call (post-dial delay), voice quality measurements (PAMS measurements), packet loss and latency, etc. In addition to recording and exporting the success or failure of the VoIP call, the VoIP call manager software 116 records and exports call quality parameters based on the call setup and measurement processes.

The VoIP call manager software 116 is also configured to broadcast alarms to a network administrator or supervising software process in the event that a given number of attempts to connect a VoIP call result in failure that exceeds a threshold. Flexibility is provided that allows the administrator to configure the failure threshold beyond which an alarm is broadcast. For example, if N consecutive VoIP call attempts result in failure, an alarm is broadcast to a network operations center alerting an administrator that one or more VoIP terminals 102 or PBXs 108 are not available. Alternatively, or in conjunction, the VoIP call manager software 116 may generate and broadcast alarms based on various thresholds regarding the call setup and measurement processes.

Figure 3:
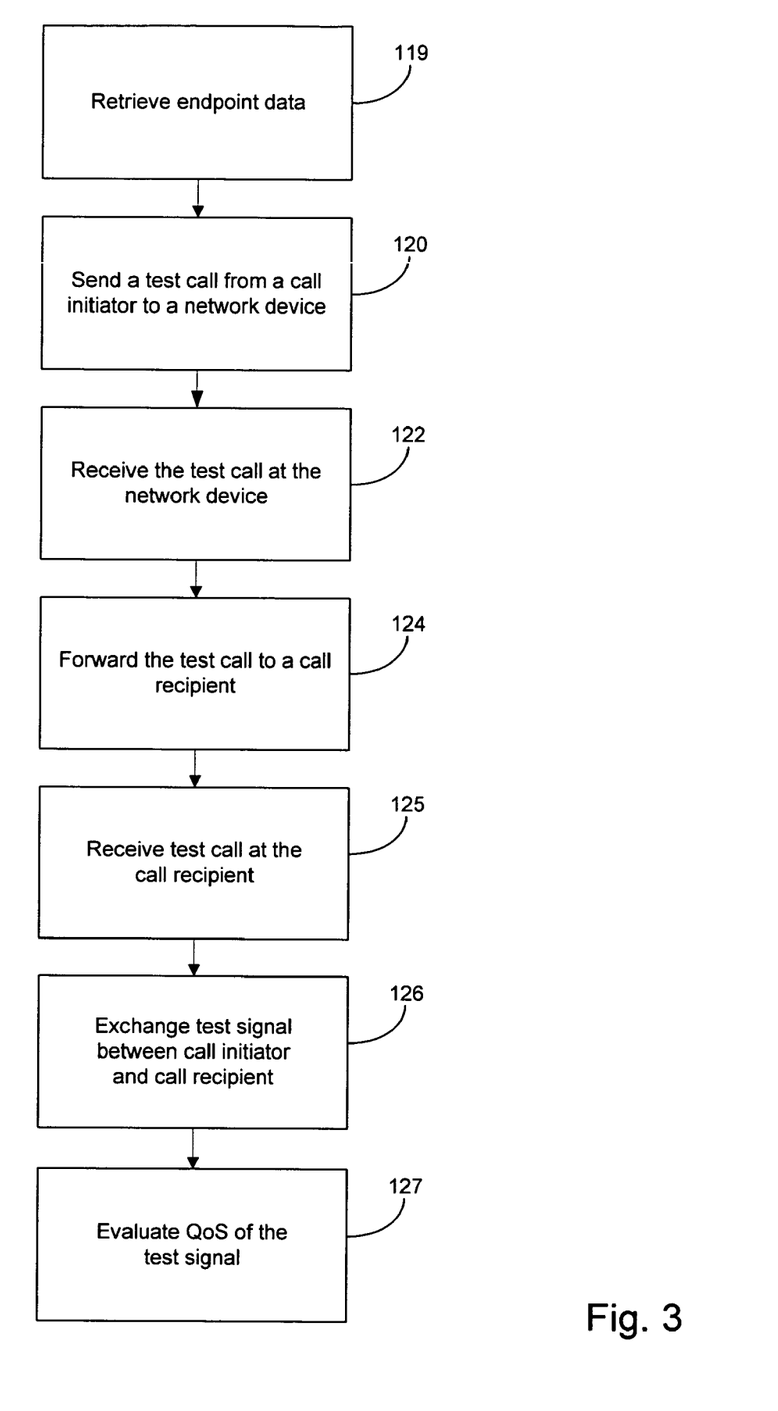
FIG. 3 is a flow chart of a method for evaluating the quality of service in an IP telephony system according to an embodiment of the invention.
Figure 4:
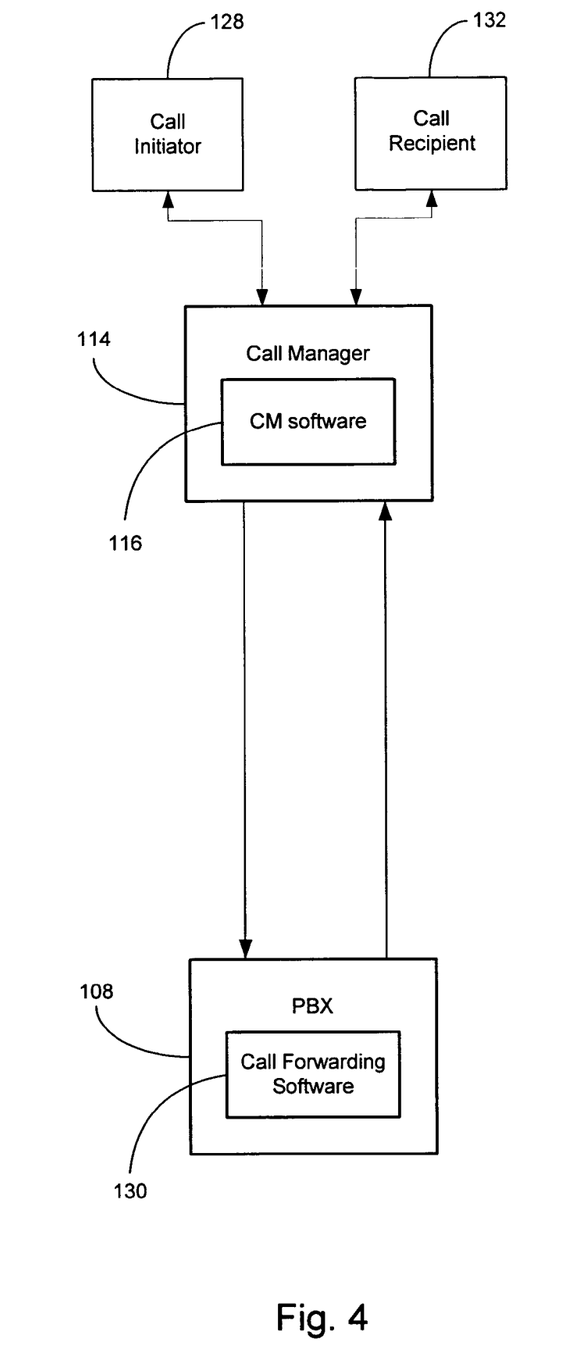
FIG. 4 is a block diagram of an exemplary configuration of hardware and software components used to evaluate the quality of service in an IP telephony system according to an embodiment of the invention.

Building on the architecture presented in FIG. 2, a method for evaluating the quality of service in an IP telephony system according to an embodiment of the invention is presented in FIG. 3 as a high-level flow chart, and in FIG. 4 as a block diagram depicting exemplary hardware and software components. Endpoint data is retrieved from a VoIP endpoint data store or other source, step 119, and a test call is sent from a call initiator 128 (FIG. 4) to a network device, such as a VoIP PBX 108, step 120. A call initiator 128 is generally a software or hardware module in a telecommunications device, such as call manager 114, that generates a test calls and test signals for transmission in an IP telephony system. In some embodiments, the call initiator 128 is a software module that is part of the call manager software 116.

The test call is received at the PBX 108 or other network device, step 122. As shown in FIG. 4, the network device is a PBX 108, but could equally be a VoIP terminal 102, a gateway 112, or other network device known in the art and used in an IP telephony system. The test call contains header information or other information identifying the intended recipient or recipients of the test signal. Call-forwarding software 130 at the PBX 108 decodes the identifying information and forwards the test call on to the intended recipient or recipients, step 124. For example, as shown in FIG. 4, call forwarding software 130 forwards the test call back to a call manager 114. In some embodiments, a VoIP terminal is preprogrammed to call forward to a specific number or network address, such as back to an initiating device to complete a round trip loop.

The test call is received at the call recipient 132, step 125. A call recipient 132 is generally a software or hardware module in a telecommunications device such as call manager 114 that receives VoIP calls and other calls and evaluates the quality of service of a test signal in an IP telephony system. In some embodiments, the call recipient 132 is a software module that is part of the call manager software 116. In other embodiments, the call recipient 132 may be a component of a VoIP terminal 102, a gateway 112, or a PBX 108.

The call is setup and a test signal is exchanged between the call initiator 128 and the call recipient 132, step 126. The test signal generated by the call initiator 128 is generally an electronic communication or other similar electronic transmission known to those skilled in the art and used to evaluate the quality of service in an IP telephony network. For example, the test signal may comprise a test tone or a reference VoIP communication that can be evaluated to determine quality of service between two nodes in an IP telephony system.

Exemplary systems and methods for generating such test tones and evaluating the quality of service in an IP telephony network are further described in application Ser. No. 09/855,156 and application Ser. No. 09/826,697 which are hereby incorporated herein by reference in their entirety. For example, application Ser. No. 09/855,156 describes a mechanism to measure voice call quality in a VoIP network using a single voice call quality test probe. Network devices are configures to play an embedded reference voice file in response to test calls placed by a test probe to these devices. The test probe measures voice call quality by recording the played voice file and comparing it to the test probe's own copy of the reference voice file. The comparison uses a standard voice call quality analysis algorithm, such as Perceptual Analysis Measurement System or Perceptual Speech Quality Measurement. As another example, application Ser. No. 09/826,697 describes a system for testing a software client or hardware module in a VoIP network path. A VoIP client connected to a VoIP network makes a series of calls to a destination. The calls activate a software client or hardware module under test. A test tool, which has access to the network, plays a series of audio files over the VoIP during the calls and also polls the software client or hardware module over the network for status information after the calls are completed. While the audio files are being played, an analyzer records the audio files at the destination for measurement of the quality of service of the calls.

The quality of service of the test signal is evaluated, as previously described herein, between the call initiator 128 and the call recipient 132, step 127. For example, in some embodiments the test signal is evaluated to determine the QoS in both directions between the call initiator 128 and the call recipient 132. In other embodiments, the test signal is evaluated to verify the voice path continuity in both directions.

Figure 5:
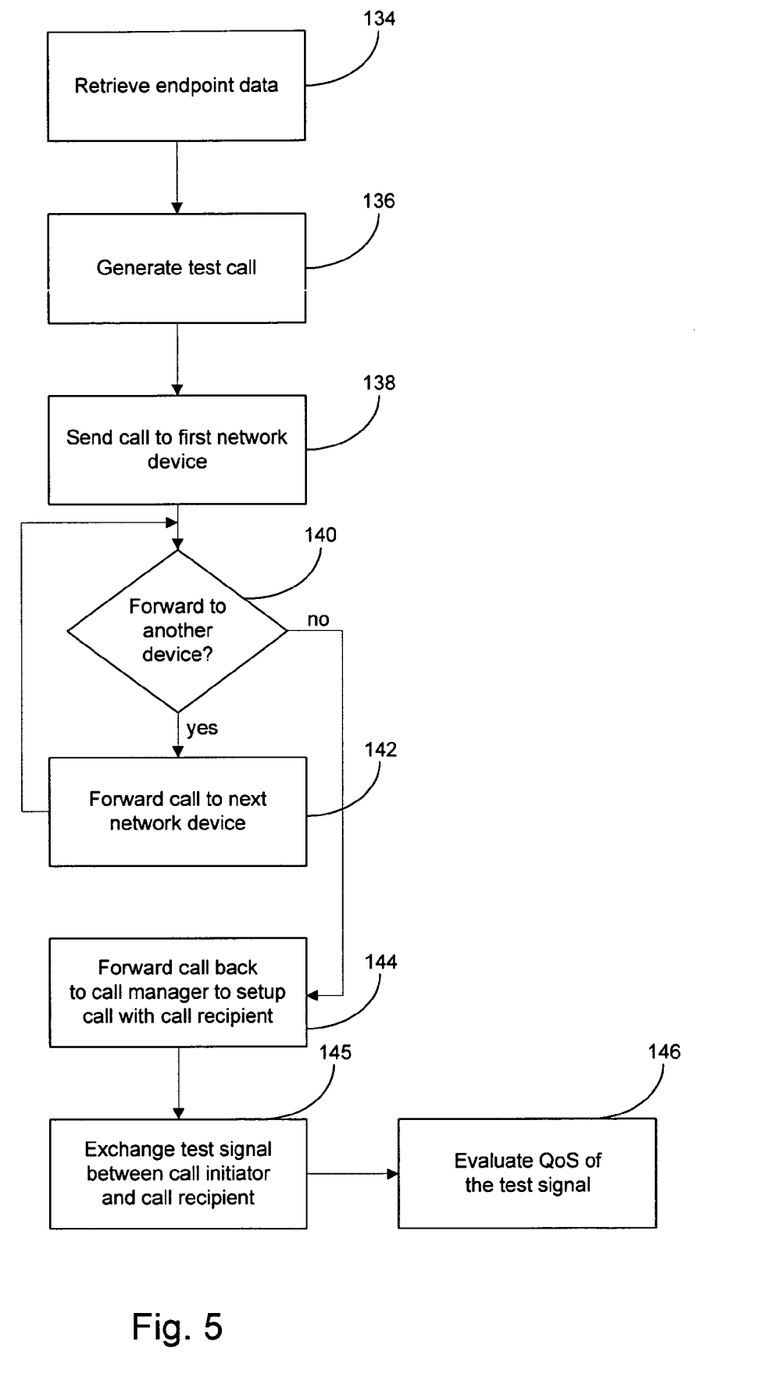
FIG. 5 is a flow chart of a method for evaluating the quality of service in an IP telephony system according to an embodiment of the invention.

FIG. 5 presents a flow chart of a method for evaluating the quality of service in an IP telephony system according to an embodiment of the invention. Call manager software 116 retrieves endpoint data from an endpoint data store 118, step 134. The endpoint data contains the address data, such as the E.164 address data, for all network devices, such as VoIP terminals 102 and PBXs 108, that the VoIP call manager 114 is to test. The call initiator 128 generates a test call, step 136, which is communicated by the call manager software 116 to the endpoint address of the first network device that is to be tested, step 138. For example, in some embodiments, the call manager software 116 communicates the test call to a PBX 108 as shown in FIG. 3. In other embodiments, the call manager software 116 might communicate the test call to a gateway 112, a VoIP terminal 102, or other network device used in an IP telephony system.

Call forwarding software 130 at the network device receiving the test call decodes header information contained in the test call and determines whether the test call should be forwarded to another network device, step 140. For example, the test call may be received and then relaunched to another network device. In some embodiments, as shown in FIG. 3, the test call is communicated from the call manager 116 to a first network device, such as a PBX 108, and then forwarded by the first network device directly back to the call manager 116. In other embodiments, however, as shown in FIG. 5, the test call may be forwarded from a first network device to one or more additional network devices before being forwarded back to the call manager 116. Thus, in some embodiments, if the header information of the test call indicates that the test call should be forwarded to multiple network devices before being forwarded back to the call manager 116, the call forwarding software 130 forwards the test call to the next network device indicated by the header information, step 142.

Otherwise, if the header information in the test call does not indicate that the test call should be forwarded to an additional network device, then the call forwarding software forwards the test call back to the call manager 114 which receives and forwards the test call to a call recipient 132 to setup the call between the call initiator 128 and the call recipient 132, step 144. A test signal is exchanged between the call initiator 128 and the call recipient 132, step 145. The test signal is evaluated, as previously described herein, to evaluate the QoS between the call initiator 128 and the call recipient 132, step 146.

Figure 6:
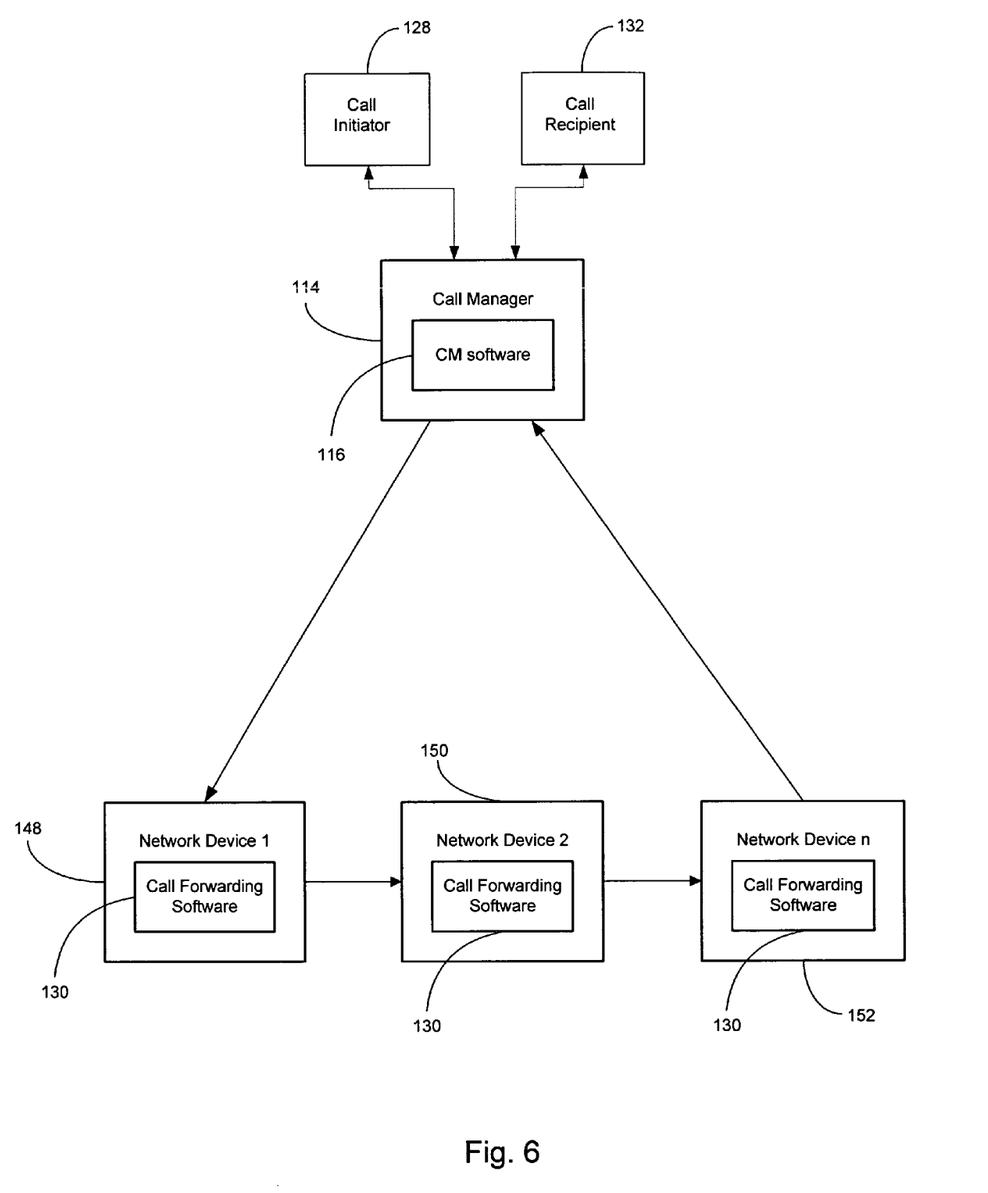
FIG. 6 is a block diagram of an exemplary configuration of hardware and software components used to evaluate the quality of service in an IP telephony system according to an embodiment of the invention.

FIG. 6 presents a block diagram of an exemplary configuration of hardware and software components used to evaluate the quality of service in an IP telephony system according to an embodiment of the invention. As shown in FIG. 5, the test call is communicated from a call manager 114 and forwarded to multiple network devices before being returned to the call manager 114. For example, such a system might be used to evaluate the quality of service in a loop of multiple network devices, a network path, a customer routing, or to perform other useful tests known in the art. A call initiator 128 generates the test call which call management software 116 at a call manager 114 communicates to a first network device 148.

Call forwarding software 130 at the first network device 148 receives the test call and decodes header information indicating that the test call is to be forwarded to a second network device 150. The call forwarding software 130 at the first network device 148 forwards the test call to the second network device 150 indicated by the header information. Call forwarding software 130 at the second network device receives the test call and decodes header information indicating that the test call is to be forwarded to an $n^{th}$ network device 152. The call forwarding software at the second network device 150 forwards the test call to the $n^{th}$ network device 152 indicated by the header information.

Call forwarding software 130 at the $n^{th}$ network device 152 receives the test call and decodes header information indicating that the test call is to be returned to the call manager 114 thus completing the loop. The call forwarding software 130 at the $n^{th}$ network device 152 forwards the test call back to the call manager 114 where call manager software 116 receives and forwards the test call to a call recipient 132 and sets up the call between the call initiator 128 and the call recipient 132. The call initiator 128 and the call recipient 132 exchange a test signal to evaluates the quality of service between the call initiator 128 and the call recipient as previously described herein.

Figure 7:
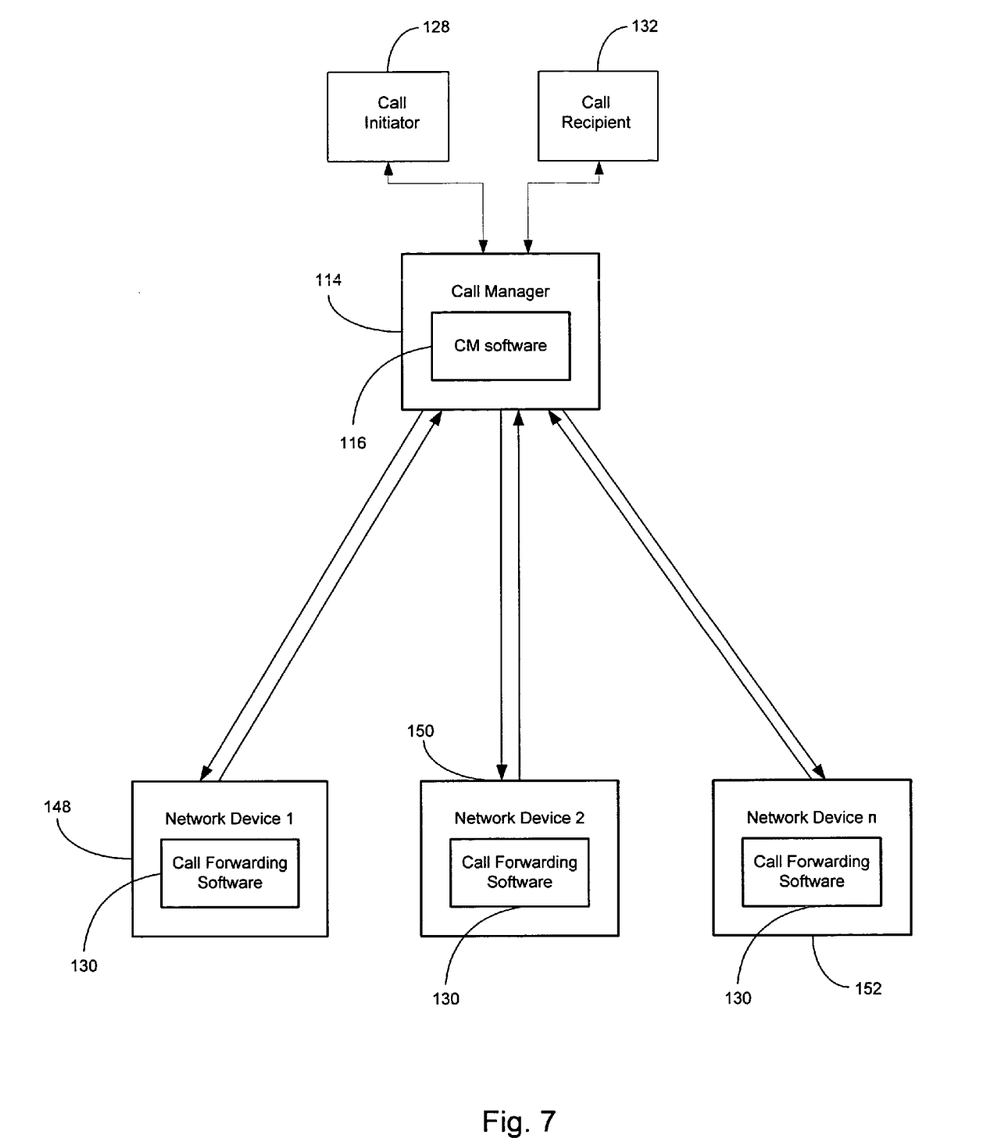
FIG. 7 is a block diagram of an exemplary configuration of hardware and software components used to evaluate the quality of service in an IP telephony system according to an embodiment of the invention.

FIG. 7 presents a block diagram of an exemplary configuration of hardware and software components used to evaluate the quality of service in an IP telephony system according to an embodiment of the invention. As shown in FIG. 6, the test call is communicated from a call manager 114 directly to multiple network devices and individually returned to the call manager 114 by each network device. For example, such a system might be used to isolate and identify quality of service characteristics in a loop of multiple network devices, a network path, a customer routing, or other network topology known in the art. For example, by evaluating the quality of service between a call manager 114 and each network device 148, 150, and 152, the call manager software 116 can determine where quality of service issues exist in the loop of network devices. A call initiator 128 generates a test call which call management software 116 at a call manager 114 communicates to a first network device 148, a second network device 150, and an $n^{th}$ network device 152. Call forwarding software 130 at each network device 148, 150, and 152 receives the test call and decodes header information contained in the test call indicating that the test call is to be forwarded directly back to the call manager 114. Each network device 148, 150, and 152 forwards the test call back to the call manager 114 where call manager software 116 receives and forwards the test calls received to a call recipient 132 and sets up calls between the call initiator 128 and the call recipient 132. The call initiator 128 and the call recipient 132 exchange one or more test signals to evaluate the quality of service as previously described herein.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method for evaluating the quality of service in an IP telephony network, the method comprising:
   communicating a test call from a call initiator via a call manager to a network device;
   determining whether the test call should be forwarded to one or more other network devices prior to forwarding the test call to the call manager;
   if the test call should not be forwarded to one or more other network devices, forwarding the test call from the network device to a call recipient via the call manager according to address information associated with the test call;
   communicating, during the test call, a test signal between the call initiator and the call recipient; and
   evaluating the quality of service between the call initiator and the call recipient according to characteristics associated with the test signal received by the call recipient.

2. The method of claim 1, wherein the test call comprises a VoIP call.

3. The method of claim 1, wherein the test signal comprises a digital audio file.

4. The method of claim 1, wherein the call initiator comprises a component of a device selected from the group consisting of: a voice over IP terminal, a gateway, call manager, and a private branch exchange.

5. The method of claim 1, wherein the network device comprises a device selected from the group consisting of: a voice over IP terminal, a gateway, a call manager, and a private branch exchange.

6. The method of claim 1, wherein the network device comprises a VoIP PBX, and comprising setting the VoIP PBX to forward the test call according to the associated address information.

7. The method of claim 1, wherein the network devices comprises a PBX associated with a gateway, and comprising setting the PBX to forward the test call according to the associated address information.

8. The method of claim 6, comprising setting the VoIP PBX to forward the test call to a predetermined address.

9. The method of claim 6, comprising setting the VoIP PBX to forward the test call back to the call initiator, wherein the call initiator and call recipient are components within one test device.

10. The method of claim 6, wherein communicating the test call comprises communicating the test call with associated address information.

11. The method of claim 10, comprising the VoIP PBX retrieving the associated address information from the test call.

12. The method of claim 1, wherein the call recipient comprises a component of a device selected from the group consisting of: a voice over IP terminal, a gateway, call manager, and a private branch exchange.

13. The method of claim 1, wherein the address information associated with the test call comprises an IP address.

14. The method of claim 1, wherein the address information associated with the test call comprises an E.164 address.

15. The method of claim 1, wherein the test call is forwarded from a first network device to at least one other network device prior to being forwarded to the call recipient.

16. A computerized method for evaluating the quality of service in an IP telephony network loop, the method comprising:
   communicating a test call from a call initiator to a first network device;
   forwarding the test call from the first network device to one or more additional network devices according to address information associated with the test signal;
   forwarding the test call from the one or more additional network devices back to the call initiator according to address information associated with the test signal;
   communicating, during the test call, a test signal between the call initiator, the first network device, and the one or more additional network devices; and
   evaluating, according to characteristics associated with the test signal, the quality of service in the communication loop comprising the call initiator, the first network device, and the one or more additional network devices.

17. A system for evaluating the quality of service in an IP telephony network, the system comprising:
   a call initiator, wherein the call initiator is programmed to communicate a test call to a network device;
   a network device, wherein the network device is programmed to forward the test call to a call recipient according to address information associated with the test call, wherein the network device is further programmed to determine whether header information in the test call indicates that the test call should be forwarded back to the call initiator; and
   a call recipient, wherein the call recipient is programmed to evaluate the quality of service between the call initiator and the call recipient according to characteristics associated with a test signal communicated, during the test call, between the call initiator and the call recipient.

18. The system of claim 17, wherein the test signal comprises a digital audio file.

19. The system of claim 17, wherein the test call comprises a VoIP call.

20. The system of claim 17, wherein the call initiator comprises a component of a device selected from the group consisting of: a voice over IP terminal, a gateway, call manager, and a private branch exchange.

21. The system of claim 17, wherein a network device comprises a device selected from the group consisting of: a voice over IP terminal, a gateway, a call manager, and a private branch exchange.

22. The system of claim 17, wherein a network device comprises a VoIP PBX set to forward the test call according to the associated address information.

23. The system of claim 17, wherein the network device comprises a PBX associated with a gateway, wherein the PBX is set to forward the test call according to the associated address information.

24. The system off claim 22, wherein the VoIP PBX is set to forward the test call to a predetermined address.

25. The system of claim 22, wherein the VoIP PBX is set to forward the test call back to the call initiator, wherein the call initiator and call recipient are components within one test device.

26. The system of claim 17, wherein the call recipient comprises a component of a device selected from the group consisting of: a voice over IP terminal, a gateway, call manager, and a private branch exchange.

27. The system of claim 17, wherein the address information associated with the test call comprises an IP address.

28. The system of claim 17, wherein the address information associated with the test call comprises an E.164 address.

29. The system of claim 17, wherein the first network device is programmed to forward the test call to at least one other network device prior to the test call being forwarded to the call recipient.

30. The system of claim 17, wherein the call initiator is programmed to evaluate the quality of service between the call initiator and the call recipient according to characteristics associated with a test signal communicated, during the test call, between the call initiator and the call recipient.

31. The method of claim 1, wherein forwarding the test call comprises forwarding the test call back to a device comprising both the call initiator and the call recipient.

32. The method of claim 1, wherein communicating the test call from the call initiator and evaluating the quality of service are performed by the same device.

33. The method of claim 1, further comprising generating an alarm based on a threshold associated with one or more of test call setup failure and the quality of service.

34. The method of claim 1, further comprising retrieving the address information from a data store storing endpoint address data identifying endpoint devices that the call initiator is to test.

35. The computerized method of claim 16, further comprising decoding the header information to determine whether to forward the test call to one of the one or more additional network devices or to forward the test call back to the call initiator.

36. The computerized method of claim 16, wherein communicating the test call from the call initiator and evaluating the quality of service are performed by the same device.

37. The computerized method of claim 16, further comprising generating an alarm based on a threshold associated with one or more of test call setup failure and the quality of service.

38. The computerized method of claim 16, further comprising retrieving the address information from a data store storing endpoint address data identifying endpoint devices that the call initiator is to test.

39. The system of claim 17, wherein the network device decodes the header information in the test call to determine whether to forward the test call to an additional network device or to forward the test call back to the call initiator.

40. The system of claim 17, further comprising a call manager configured to evaluate quality of service in a loop of network devices including the network device and one or more additional network devices.

41. The system of claim 17, wherein the call recipient is further programmed to generate an alarm based on a threshold associated with one or more of test call setup failure and the quality of service.

42. The system of claim 17, further comprising a data store storing endpoint address data identifying endpoints that the call initiator is to test.

43. A computerized method for evaluating the quality of service in an IP telephony network, the method comprising:

at a test call manager, generating a test call having header information identifying one or more network devices to be tested;

sending the test call to a first network device to be tested;

determining, based on the header information, whether the test call should be sent to one or more other network devices to be tested prior to being sent back to the call manager;

sending the test call back to the call manager if the header information does not indicate one or more other network devices that the test call should be sent to prior to being sent to the call manager; and otherwise, sending the test call to at least one of the one or more network devices indicated in the header according to address information in the test call.

44. The computerized method of claim 43, further comprising, after sending the test call to one or more other network devices indicated in the header, sending the test call back to the call manager to form a loop of network devices for testing quality of service.

* * * * *